United States Patent

[11] 3,575,492

| [72] | Inventors | Edward Oskar Nester<br>Hightstown;<br>Bernard Joseph Lechner, Princeton, N.J. |
|---|---|---|
| [21] | Appl. No. | 840,731 |
| [22] | Filed | July 10, 1969 |
| [45] | Patented | Apr. 20, 1971 |
| [73] | Assignee | RCA Corporation |

[54] TURNOFF METHOD AND CIRCUIT FOR LIQUID CRYSTAL DISPLAY ELEMENT
7 Claims, 4 Drawing Figs.

| [52] | U.S. Cl. | 350/160 |
|---|---|---|
| [51] | Int. Cl. | G02f 1/28 |
| [50] | Field of Search | 350/160, (L.C. Digest) |

[56] References Cited
UNITED STATES PATENTS

| 3,322,485 | 5/1967 | Williams | 350/160 |
|---|---|---|---|
| 3,499,112 | 3/1970 | Heilmeier et al. | 178/7.7 |
| 3,519,330 | 7/1970 | Heilmeier | 350/160 |

Primary Examiner—Ronald L. Wibert
Assistant Examiner—J. Rothenberg
Attorney—H. Christoffersen ABSTRACT: Nematic liquid crystal element of the type exhibiting dynamic scattering is erased by applying an alternating voltage to the element at a frequency in the range 2 to 20 kilohertz.

INVENTORS
Edward Oskar Nester, and
Bernard Joseph Lechner.
BY Samuel Cohen
ATTORNEY

TURNOFF METHOD AND CIRCUIT FOR LIQUID CRYSTAL DISPLAY ELEMENT

BACKGROUND OF THE INVENTION

The article "Dynamic Scattering: A New Electro-optic Effect..." by G. H. Heilmeier, L. A. Zanoni and L. A. Barton, Proceedings of the IEEE, Volume 56, No. 7, July, 1968, discusses nematic liquid crystals of a type of interest in the present application. As explained there, such crystals, when in an unexcited state, are relatively transparent to light and when placed in an excited state by an applied electric field, scatter light. The light scattering, termed "dynamic scattering," is believed to result from turbulence developed in the crystal.

The dynamic scattering exhibited by liquid crystals may be employed in reflective, absorptive and transmission type flat panel displays, in light shutters and in other applications. However, the natural recovery time of the crystal, that is, its "turnoff" time, which is a function of such factors as the crystal material, the spacing between electrodes, and the crystal temperature, is relatively long. For example, a typical turnoff time at room temperature for typical materials with one-half mil spacing between the electrodes is about 60 milliseconds (0.06 seconds). In some cases the turnoff time can be much longer. For certain applications, as for example, commercial television, the long turnoff time is a serious disadvantage. When the video information changes, within a relatively few frame intervals, the elements will not be able to follow the changes with sufficient rapidity. This results in objectionable smear of moving objects, known as "trailing edge" smear.

The object of this invention is to provide a new and improved method and circuit for quickly erasing a liquid crystal display element.

SUMMARY OF THE INVENTION

A nematic liquid crystal element is turned off according to the teachings of the invention by applying an alternating voltage to the element at a frequency in a range 2 to 20 kilohertz.

DETAILED DESCRIPTION

If a direct voltage or low-frequency, alternating voltage turn-on pulse, of an amplitude which exceeds the threshold for dynamic scattering of a liquid crystal is applied to the crystal for a sufficient length of time, the crystal scatters light. Such a direct-current pulse is shown by way of example at a in FIG. 1 and typically may be 10 milliseconds in duration and 50 volts in amplitude for a crystal having a one-half mil spacing between electrodes. The electrical excitation of the crystal is believed to cause turbulent domain motion in the crystal and this manifests itself as a change from a nonscattering, that is, an essentially transparent state to a light scattering state.

The optical response of the crystal, when excited in the manner discussed above, is shown at b in FIG. 1. The curve is obtained by a photomultiplier circuit connected through a suitable amplifier to a cathode-ray oscilloscope. During the 10 millisecond interval of the turn-on pulse, the light scattered by the crystal reaches maximum intensity, as indicated by the region 12 of the curve b of FIG. 1. When the turn-on pulse is removed, the amount of light scattered by the crystal decays but does so relatively slowly. It is believed that light scattering continues to exist because of the mechanical time constant of the liquid crystal material and perhaps there are also other reasons. However, regardless of the reasons, actual tests have shown that the turnoff time typically may be 60 milliseconds or more as shown at b in FIG. 1.

Figure 1:
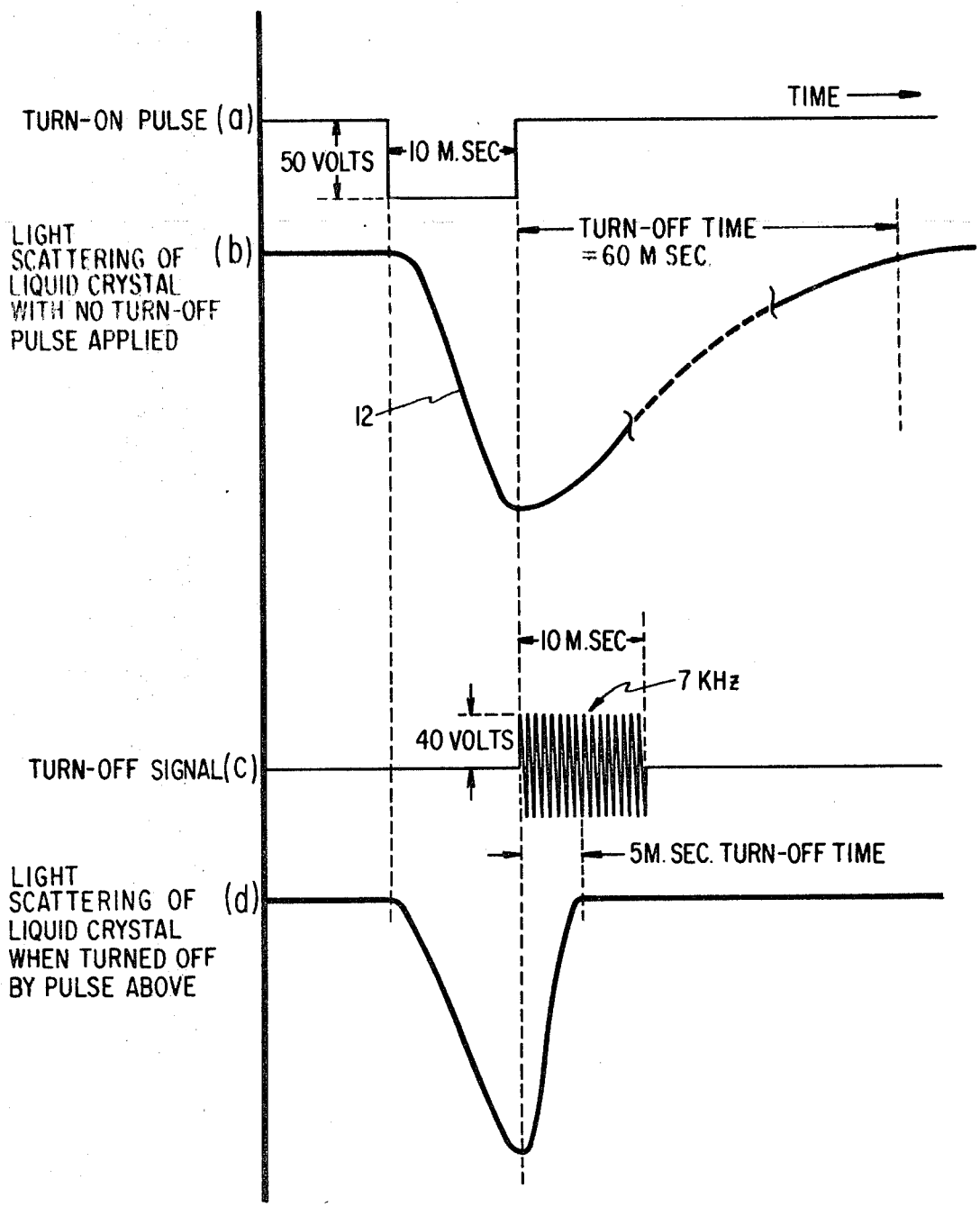
FIG. 1 is a drawing of waveforms to help explain the invention.

In accordance with the present invention, a turnoff signal such turnoff shown at c in FIG. 1 is applied to the liquid crystal immediately upon the termination of the turn-on pulse. The peak amplitude of the alternating voltage may be close to that of the turn-on pulse and, for example, may be between 40 and 60 volts. This FIG. and others given here are merely examples as the actual values of voltages, frequencies and so on which are employed will depend upon the cell's dimensions, material, temperature and so on. For example, liquid crystal elements with relatively closely spaced electrodes require turn-on and turnoff signal voltages of lower amplitude than do liquid crystal elements with relatively widely spaced electrodes.

There is a range of frequencies which are possible for the alternating voltage of the turnoff signal. For example, frequencies from 7 to 8 kilohertz seem to work best but frequencies in the entire range from 2 to 20 kilohertz were found to increase the speed of erasure. Low frequencies, such as those below perhaps 500 hertz, were unsuitable and in fact produced dynamic scattering rather than erasure. Frequencies which are too high, such as those above 100 kilohertz, do not produce any significant reduction in turnoff time.

Based on the operation exhibited above and on other studies not necessary to discuss here, a theory has been developed to explain why nematic liquid crystals such as described above operate in the way they do in response to an applied alternating electric field. It is believed that there are two competing effects. One is the tendency of the dipoles of the crystal (the rodlike elements) to follow the field. When the field is in one direction, the dipoles tend to line up in that direction and as the field changes its direction, the dipoles tend to flip over and align with the field in the other direction. This effect tends to cause the liquid crystal to look relatively transparent because the dipoles become aligned in a regular pattern. The second effect is that the voltage creating the electric field causes ions to be injected into the liquid crystal and these ions tend to cause turbulent motion of the dipoles making up the crystal. The turbulent motion manifests itself as the dynamic scattering of light. In other words, this competing effect tends to make the crystal relatively opaque, that is, it causes light scattering to occur.

According to the present theory, at relatively low frequencies the second effect discussed above predominates because its time constant is substantially shorter than that of the applied field. Therefore, when a relatively low frequency electric field is applied to the crystal, dynamic light scattering should occur and this is borne out in practice. On the other hand, as the alternating frequency is increased, the first effect tends to predominate. In other words, the time constant for the ion created turbulence becomes relatively longer than the tendency for the dipoles to follow the electric field. Therefore, the dipoles flip back and forth rapidly, all in alignment, and all at substantially the frequency of the applied electric field. This occurs much more rapidly than ions can be injected into the liquid crystal to create turbulent motion. The result is that the liquid crystal becomes erased, that is, it appears to be relatively clear.

The theory also explains why very high frequency alternating electric fields do not produce any significant reduction in turnoff time. At these fields, for example, fields at a frequency above 100 kilohertz, the time constant of the mechanical movement of the dipoles becomes substantially longer than that of the frequency of the applied electric field and the dipoles are unable to follow the rapid reversals of the field. Similarly, the time constant for ion injection is also much much longer than that of the frequency of the applied electric field.

An important feature of erasing by means of an applied alternating electric field is that natural relaxation times are not relied upon. In other words, the dipoles of the crystal are forced to move at the frequency of the electric field and for this reason the erasure time is substantially shorter than if the crystal dipoles were permitted naturally to relax to their nonlight scattering condition.

The invention of the present application should not be confused with the use of an alternating electric field, within the frequency range employed in the present invention, for erasing a recently discovered family of liquid crystal mixtures. These mixtures, which exhibit storage properties, consist of at least one nematic liquid crystal substance, for example, of the type described herein, with either cholesterol and/or cholesterol derivatives and/or cholesteric liquid crystals.

In the quiescent or unexcited state such a liquid crystal mixture consists of an essentially single-phase, homogeneous molecular solution of guest molecules of a cholesteric liquid crystal, cholesterol or cholesterol derivatives in a host nematic liquid crystal. This solution is essentially transparent. When a direct or a low frequency alternating electric field is applied to this mixture, the single-phase molecular solution of the guest molecules in the nematic host separates into two phases, a nematic host phase and a cholesterol or cholesteric guest phase and the mixture resembles an emulsion. When the exciting electric field is removed, the turbulent motion of the nematic crystals ceases, but the mixture remains in a two phase emulsionlike state for a period of time which depends upon the particular mixture. In this state, probably because of the emulsionlike condition of the liquid, light scattering continues for long periods, for example, for weeks, even though the exciting electric field is no longer present. This state of the mixture is termed its storage state.

Erasure of the mixture discussed above is by applying an alternating electric field, just as in the present application. However, the mechanism causing the erasure is quite different than in the present invention. The application of the relatively high-frequency electric field to the mixture in the two phase emulsionlike state causes a breakdown of the emulsion similarly to what would occur if the mixture were mechanically struck or mechanically agitated. When the emulsion is destroyed, the mixture reforms as an essentially single-phase, homogeneous molecular solution, such as in the quiescent state, as already described. In this state, the solution is essentially transparent. Clearly, this erasure mechanism is entirely different than that of the present invention.

Returning to the present invention, in the example shown in FIG. 1, the turnoff time is reduced from 60 to 5 milliseconds with an erase signal of 10 milliseconds duration, 40 volts peak amplitude and 7 kilohertz frequency. The wave shape of the turnoff voltage is not critical; it can be sine, square or other shape so long as it is alternating and within the correct frequency and voltage range.

The turnoff method and circuit of the present application also have a number of other advantages. It is found, for example, that liquid crystal cells have a longer lifetime when subjected to an alternating voltage rather than to a direct voltage or to pulses of the same polarity. The present erasure method therefore has this advantage. In the case the turn-on signal would be low-frequency AC. A second advantage of the present method is that the width of the turnoff pulse is not critical. Thus, as may be observed at c in FIG. 1, while the turnoff pulse is 10 milliseconds in duration and the turnoff time of the liquid crystal is 5 milliseconds, the fact that the turnoff pulse has a longer duration than the turnoff time does not adversely affect the liquid crystal cell performance.

Another advantage observed is that the application of an alternating voltage signal in the range given actually makes the cell darker than it is in the absence of alternating voltage excitation. For some cells, the maximum light output to minimum light output ratio, that is, the contrast ratio is improved by a factor from 1½ to 2 employing the turnoff method described above (this is not illustrated in FIG. 1d but it has been found to be so). In this mode of operation, the alternating voltage is left on at all times except when the cell is to be excited.

Figure 2:
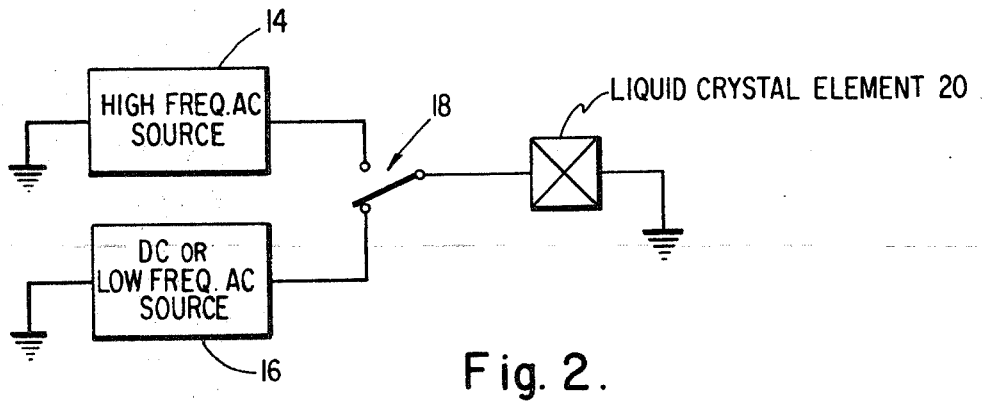
FIG. 2 is a block circuit diagram of a circuit for demonstrating the effect shown in FIG. 1.

A simple test setup for obtaining the performance illustrated in FIG. 1 is shown schematically in FIG. 2. It includes a relatively high frequency (2—20 kilohertz) alternating voltage source 14, a direct voltage or low frequency alternating (from a few hertz to perhaps 400 hertz) source 16, switch 18 and liquid crystal element 20. While element 18 is shown as a mechanical switch, this is meant merely to be symbolic. In practice, the switch preferably comprises a transistor or other solid state circuit and means for controlling the circuit to first permit a turn-on signal derived from the source 16 to be applied to the crystal and then to permit an alternating voltage turnoff signal derived from source 14 and shown in FIG. 1c to be applied to the crystal.

Figure 3:
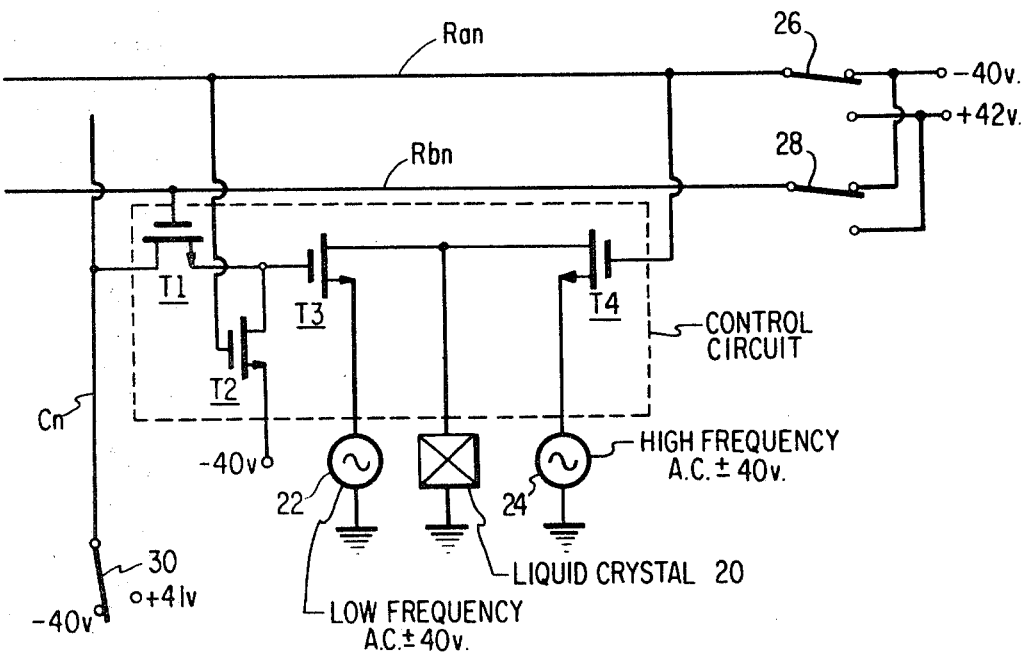
FIG. 3 is a schematic diagram of a circuit embodying the invention.

A schematic circuit diagram of one cell of an array of cells is shown in FIG. 3. This circuit does have a typical transistor circuit such as mentioned above which includes four field-effect transistors, T1, T2, T3 and T4. In this particular example, the transistors chosen are of the N channel, MOS enhancement type which are off when the gate to source voltage is zero and which are on when the gate voltage is one or more volts more positive than the source voltage. Transistors T2 and T4 are connected at their gate electrode to row line $R_{an}$ and transistor T1 is connected at its gate electrode to row line $R_{bn}$. Transistor T1 is also connected at its drain electrode to the column lead $C_n$.

A source 22 of low-frequency alternating voltage is connected to the source electrode of transistor T3 and a source 24 of high-frequency alternating voltage is connected to the source electrode of transistor T4. For purposes of the present example, it may be assumed that in each case the peak voltages produced by 22 and 24 are ±40 volts, that the low-frequency is 60 hertz, and that the high-frequency is 7 kilohertz. The liquid crystal element 20 is connected between the drain electrodes of transistors T3 and T4 and ground.

In the operation of the circuit of FIG. 3, if both row lines $R_{an}$ and $R_{bn}$ are at —40 volts, transistors T1, T2 and T4 are "off." Transistor T3 also may be assumed to be off.

If now the second row line $R_{bn}$ is raised to a voltage of +42 volts while the first row line $R_{an}$ is retained at —40 volts, transistor T1 is turned-on. If at the same time, the column lead $C_n$ remains at —40 volts, approximately —40 volts is applied via transistor T1 to the gate electrode of transistor T3 and T3 remains in the off state. However, if now the column $C_n$ is raised to a voltage of +41 volts, this forward bias voltage appears via the source-to-drain path of transistor T1, at the gate of transistor T3 and transistor t3 turns on. The low-frequency alternating voltage produced by source 22 is now applied via transistor T3 to the liquid crystal cell 20 and it scatters light at full intensity.

The voltage applied to the row $R_{bn}$ may now be returned to —40 volts before the voltage on the column $C_n$ is reduced to —40 volts. In this case, the transistor T1 is turned off before the charge stored in the distributed capacitance of the gate electrode of transistor T3 can discharge, and the gate of T3 remains at a voltage of +41 volts. Therefore, the low-frequency voltage provided by source 22 will continue to excite the liquid crystal 20 and this excitation will remain so long as the gate electrode of transistor T3 retains its charge.

When it is desired to turnoff the liquid crystal element 20, the voltage on the row lead $R_{an}$ is changed from —40 to +42 volts for an interval of about 10 milliseconds. During the same period, the column lead $C_n$ and the row lead $R_{bn}$ are both at —40 volts. When the row lead $R_{an}$ is raised to +42 volts, transistors T2 and T4 are turned-on. When transistor T2 is turned-on, the charge stored in the gate electrode of transistor T3 is discharged through the source-to-drain path of transistor T2 and the gate voltage of transistor T3 is placed at —40 volts turning off transistor T3. This removes the low-frequency excitation from the liquid crystal. Concurrently, as transistor T4 is on, the high-frequency excitation from source 24 is applied to the liquid crystal element 20 and the latter is very rapidly turned off in the manner indicated in FIG. 1d.

It should be noted that this circuit is suitable for use in a matrix display where coincident selection is required. Separate energization of $R_{bn}$ to +42 volts or $C_n$ to +41 volts does not cause T3 to be turned-on. Only when both events occur coincidentally will T3 be turned-on as described above.

While in FIG. 3, the means for changing the direct voltage on the row and column leads are illustrated as mechanical switches 26, 28 and 30, in practice electrically controlled solid state switches preferably are employed instead. These switches may, for example, be the switches of a conventional matrix decoder network.

Figure 4:
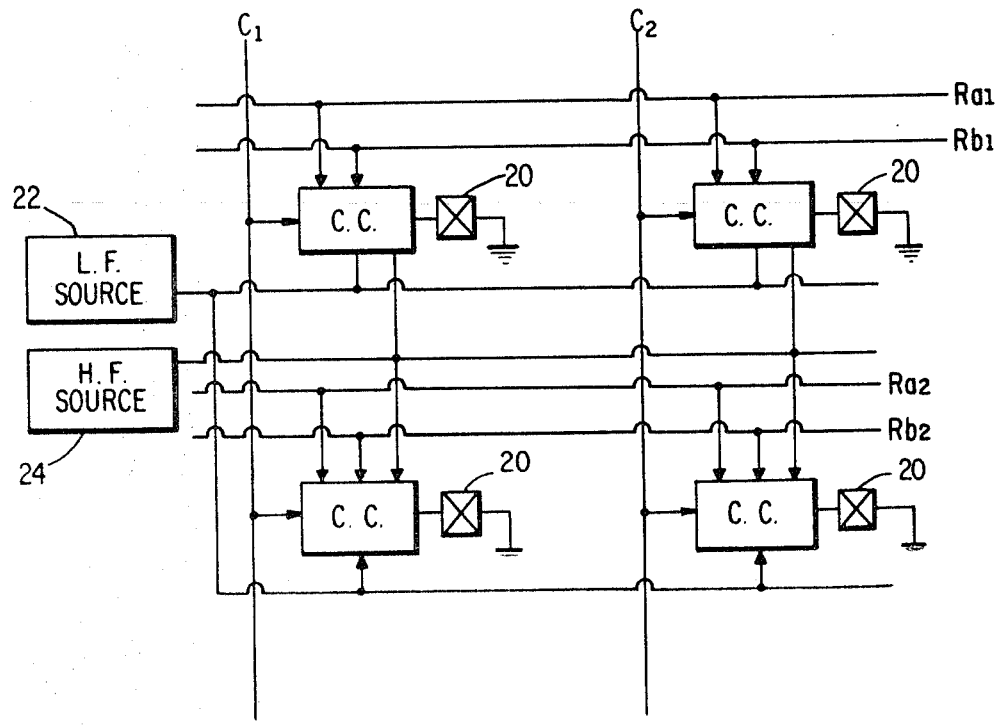
FIG. 4 is a block and schematic diagram of a liquid crystal matrix display embodying the invention.

A two-by-two array according to the invention is illustrated in FIG. 4. Each block legended C.C. represents the control circuit within the dashed block of FIG. 3. The liquid crystal elements 20 at each location may be individual elements or may be a common liquid for the entire matrix located between a pair of transparent insulating plates and with individual electrodes, one connected to ground and the other to a control circuit, at each location. The operation of the matrix should be self-evident from the description of FIG. 3. The matrix may be addressed an element at a time or row at a time in conventional fashion by appropriate choice of the voltages applied to the column leads and row lead pairs. The erase operation is a row-at-a-time however in either event.

We claim:

1. A method for erasing a cell which contains a liquid crystal solely of the nematic type which is into light scattering condition comprising the step of applying an alternating voltage to the cell in the range of about 2 to 20 kilohertz.

2. A method for erasing a display element containing a liquid crystal solely of one type, namely a liquid crystal of the nematic type which exhibits dynamic scattering and whose dipoles are in a turbulent state as a result of an applied electrical turn-on voltage comprising the step of applying a burst of alternating voltage to the element having a duration of at least milliseconds and a frequency in the range of 2 to 20 kilohertz.

3. In combination:
   a liquid crystal element containing a liquid crystal solely of one type, namely a liquid crystal of the nematic type exhibiting dynamic scattering;
   means coupled to said element for exciting the same and causing it to scatter light; and
   means coupled to said element for erasing the same comprising for applying a burst of alternating voltage to said crystal in the range of 2 to 20 kilohertz.

4. In the combination as set forth in claim 3, said alternating voltage being in the range of 6 to 9 kilohertz.

5. A display matrix comprising, in combination:
   a plurality of pairs of rows leads and a plurality of column leads;
   a plurality of control circuits, one coupled between each pair of row leads and each column lead;
   a source of turn-on voltage coupled to all control circuits;
   a source of turnoff voltage in the range of 2—20 kilohertz coupled to all control circuits;
   A plurality of locations defined by the intersection of each pair of row leads and each column lead, each including a liquid crystal which is solely of the nematic type and each coupled to a different control circuit; and
   means for addressing said display locations comprising means for applying voltages to said row and column leads for causing said control circuits to connect the turn-on and turnoff voltage sources to the liquid crystal at the respective locations.

6. A display matrix as set forth in claim 5, wherein each control circuit includes field-effect transistor means.

7. A method of increasing the contrast-ratio in a nematic liquid crystal comprising the step during the operation of the crystal of applying an erasing alternating electric field to the crystal in the range 2—20 kilohertz for all periods except those when an exciting electric field for causing light scattering to occur is applied to the crystal.

UNITED STATES PATENT OFFICE
CERTIFICATE OF CORRECTION

Patent No. 3,575,492　　　　　　　Dated　April 20, 1971

Inventor(s)　Edward O. Nester and Bernard J. Lechner

It is certified that error appears in the above-identified patent and that said Letters Patent are hereby corrected as shown below:

Column 5, line 22, "into" should read ---in its---
Column 6, line 10, "rows" should read ---row---
Column 6, line 17, change "A" to ---a---
Column 6, line 24, change "turnoff" to ---turn-off---

Signed and sealed this 21st day of September 1971.

(SEAL)
Attest:

EDWARD M. FLETCHER, JR.　　　　　ROBERT GOTTSCHALK
Attesting Officer　　　　　　　　Acting Commissioner of Patc